M. I. YOUNG.
DOUGH RAISING DEVICE.
APPLICATION FILED FEB. 28, 1911.

1,013,260. Patented Jan. 2, 1912.

Inventor
Maimie I. Young,
By Shepherd & Campbell
Attorneys

Witnesses
A. M. Murray
Thos. A. Connwell

UNITED STATES PATENT OFFICE.

MAIMIE I. YOUNG, OF KEARNEY, NEBRASKA.

DOUGH-RAISING DEVICE.

1,013,260.          Specification of Letters Patent.          Patented Jan. 2, 1912.

Application filed February 28, 1911. Serial No. 611,362.

*To all whom it may concern:*

Be it known that I, F. B. YOUNG, whose full and true name is MAIMIE I. YOUNG, a citizen of the United States of America, residing at Kearney, in the county of Buffalo and State of Nebraska, have invented certain new and useful Improvements in Dough-Raising Devices, of which the following is a specification.

This invention relates to a dough raising device, the object of the invention being to provide a structure in which freshly mixed dough may be placed and there subjected to an even and moderate heat so that the yeast contained within the dough will cause the dough to rise in the usual and well known manner.

A further object of the invention is the provision of a structure which may be employed to keep bread and cake in, when it is not in use for raising dough.

A further object of the invention is the provision of improved means for releasing some of the heat contained within the dough raiser after the dough has risen to a predetermined degree.

Figure 1:
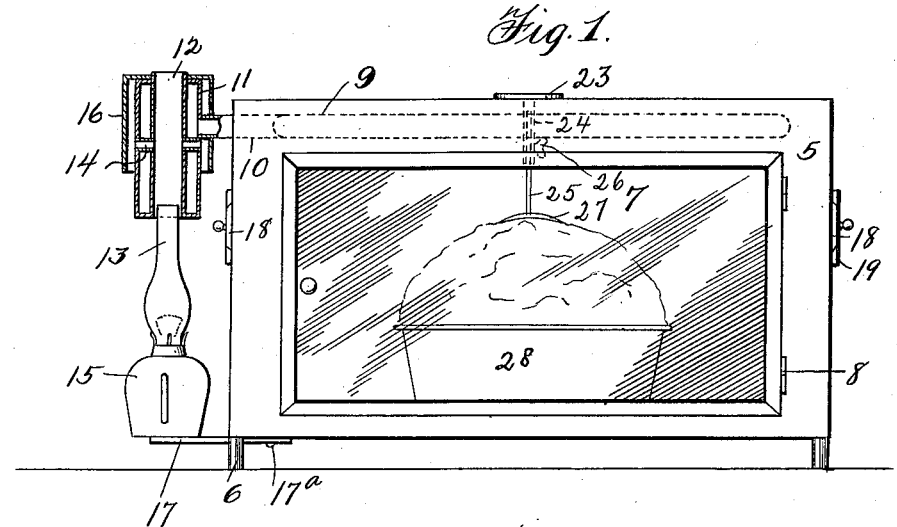
Figure 2:
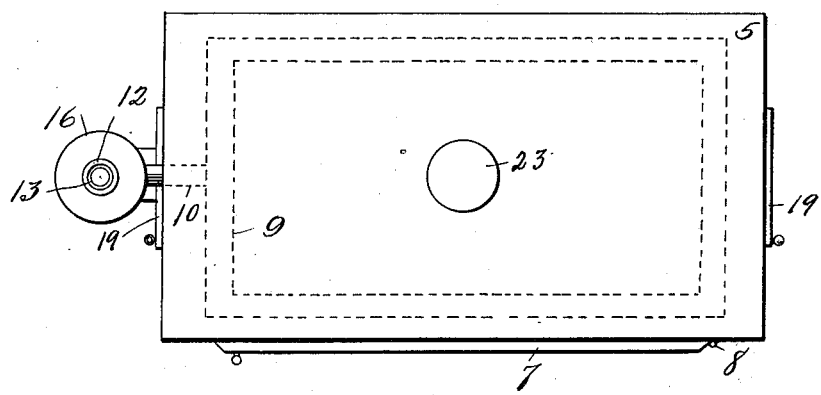
Figure 3:
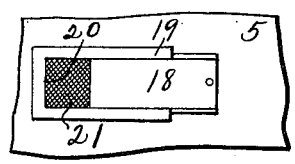
Figure 4:
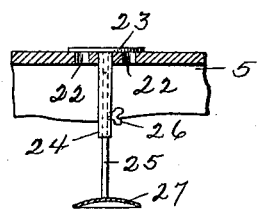

Further objects and advantages of the invention will be set forth in the detailed description which now follows:

In the accompanying drawing, Figure 1 is a view partly in front elevation and partly in section, illustrating a dough raiser constructed in accordance with the invention, Fig. 2 is a plan view thereof, Fig. 3 is a detail view of one of the ventilating slides employed at the opposite ends of the casing, and, Fig. 4 is a detail view of the device for automatically releasing some of the heat.

Like numerals designate corresponding parts in all of the figures of the drawing.

Referring to the drawing, the numeral 5 designates a casing which may be of any size or shape. This casing is preferably mounted upon feet 6 and is provided with a glass door 7 that may be hinged at any of its sides as indicated at 8. A hot water heating pipe 9 extends around the casing near the top thereof and a branch 10 of said pipe leads to a water containing receptacle 11 through which a central tubular member 12 passes. The upper end of a lamp chimney 13 is adapted to enter this central tubular member to heat the water contained within the receptacle 11. Horizontal tubes 14 lead from the central tubular member 12 through the water receptacle 11 and a portion of the heat from the lamp 15 passes through these tubes and enters a hood 16 which is open at its lower end. This traps some of the heat within this hood and aids in heating the water. The heated water rises to the top of the receptacle 11 and as the water continues to heat, the hot water finally reaches a point as low as the entrance to pipe 10. The comparatively cold water in the top of this pipe descends and the warmer water flows laterally in this pipe, this action continuing throughout the pipe 9. A swinging plate 17 is pivoted at 17ª to the underside of the casing 5 and after the lamp chimney 13 has been entered in the tubular member 12 this slide may be swung around beneath the lamp to support said lamp. At each end, the casing is provided with ventilating slides 18 which are mounted to slide in frames 19 and to cover openings 20, said openings in turn being covered by screens 21. As is best illustrated in Fig. 4, the top of the casing is provided with openings 22. These openings are normally closed by a disk 23, said disk being carried by a downwardly extending tubular member 24. A rod 25 slides in this tubular member and is adapted to be bound in various positions of vertical adjustment with relation to said tube by a thumb screw 26. The rod 25 carries at its lower end a saucer-like disk 27.

The operation of the device is as follows: A pan of dough indicated at 28 having been placed within the casing 5 and the door 7 closed, the dough within the pan is subjected to an even and moderate heat by the hot water circulating within the pipe 9, it being understood that this hot water is derived from the receptacle 11 which in turn is heated by the lamp 15. By locating the pipe entirely above the pan of dough, withdrawal of the pan is not interfered with and the upper portion of the dough is subjected to a moderate and even heat. It is a well known fact, however, that if dough is subjected to too much heat or to enough heat to cause an undue fermentation of the yeast, the dough will become sour. To prevent this, the structure shown in Fig. 4 is provided. When the dough rises enough to contact with the disk 27, further upward movement of the dough lifts the disk 23 from openings 22 and permits the escape of some of the heat. In this way, the danger of the dough rising too much is avoided.

The structure shown in Fig. 4, however, may be omitted if desired.

When using the device as a bread and cake box, merely for the purpose of storage, the ventilating slides 18 may be opened, at which time, the interior of the casing 5 will be properly ventilated. It will of course be understood that at this time, the lamp 15 is not lighted. The screening of the openings 20 prevents the entry of rats and mice, while at the same time permitting the free passage of air.

By making the device shown in Fig. 4 adjustable, large and small pans of dough may be caused to act satisfactorily in conjunction therewith.

It has been found that a device of this character yields very satisfactory results. It is not necessary to heat an entire room for the purpose of causing the dough to rise as is very often done. By the employment of this device, only the lamp used in conjunction therewith need be burned. All other heat may be omitted from the room and still a proper raising of the dough be had.

The provision of a glass door renders it possible for the user to see the condition of the dough without the necessity of opening the door and thereby permitting the loss of the heat contained within the casing.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. The combination with a casing having openings in the top thereof, of a hot water heating coil located therein adjacent the top thereof, said coil lying in a horizontal position, a dough container located within said casing, a member adapted to close the openings, and means connected to said member and projecting into the path of the rising dough, whereby said dough as it rises uncovers said openings to permit the escape of surplus heat.

2. The combination with a casing having openings formed in the top thereof, of a disk normally covering said openings, a tubular member connected to said disk and projecting within said casing, a rod slidably disposed within said tubular member, means for binding said rod within said tubular member, a disk carried by the lower end of said rod, a heating element within said casing and a dough container located beneath said disk.

In testimony whereof I affix my signature in presence of two witnesses.

MAIMIE I. YOUNG.

Witnesses:
F. B. YOUNG,
F. A. NYE.

---

Copies of this patent may be obtained for five cents each, by addressing the "Commissioner of Patents, Washington, D. C."